United States Patent Office 2,721,785
Patented Oct. 25, 1955

2,721,785

ACRYLONITRILE-STYRENE COPOLYMER FILAMENTS AND PROCESS OF PRODUCING SAME

Walter J. Zybert, Morris Township, Morris County, N. J., assignor to Allied Chemical & Dye Corporation, New York, N. Y., a corporation of New York No Drawing. Application November 9, 1950, Serial No. 194,939

5 Claims. (Cl. 18—54)

This invention relates to filament consisting essentially of acrylonitrile-styrene copolymer; and to fibers, threads, yarns, bristles and like mono- and multi-filament structures consisting essentially of said copolymer; and to dimethyl formamide solutions of said copolymer.

Acrylonitrile homopolymers and certain copolymers containing major proportions of acrylonitrile are recognized as having valuable properties for fabrication into filamentary structures. The copolymer system of styrene with acrylonitrile has been a subject of study in the art for filament fabrication therefrom. Such study heretofore had led to the conclusion that if styrene is to be copolymerized with acrylonitrile at least one other copolymerizable constituent in addition to acrylonitrile and styrene is essential to obtain a copolymer which can be spun.

I have now found that employment of copolymerizing and spinning technique as outlined below, and more specifically illustrated in the below examples, makes possible formation of acrylonitrile-styrene copolymer solutions from which filaments of very good properties can be obtained, without incorporation in said copolymer of any other copolymerizable constituent; and that filaments so prepared consisting essentially of acrylonitrile-styrene copolymer have particular advantage in their high susceptibility to dyestuffs as compared to polyacrylonitrile and most known copolymers predominating in acrylonitrile including copolymers of acrylonitrile, styrene, and a third component such as methyl methacrylate. For example with acetate dyes, the new filaments are rapidly dyed to final level at the boil and reach shades much deeper than obtainable with the same dye on other acrylonitrile based filaments even after prolonged boiling. In certain other respects, such as tensile strength and elongation, these filaments are comparable to acrylonitrile based filaments now on the market.

In accordance with my invention, about 4 parts by weight of acrylonitrile and one part by weight of styrene are copolymerized in aqueous emulsion at temperatures not above about 75° C. with an inorganic polymerization catalyst and preferably with addition of styrene component to the reaction mixture during the reaction at a rate which maintains approximately constant, throughout the reaction period, the ratio of unreacted monomers present in the reaction mixture. The copolymer emulsion thus obtained is broken and the copolymer product is washed and dried. Copolymer is then dissolved in dimethyl formamide to form a solution with 10–15% solids content and viscosity at room temperatures between about 300 and about 1000 poises.

This dimethyl formamide solution is then spun into filamentary form and is coagulated in 2 distinct steps. The first step is an extrusion of the solution up through a spinnerette into a warm water bath in which the surface of the jet of viscous solution is gelled by extraction of dimethyl formamide and infusion of water at the surface. The second coagulation step is passage of the surface gelled filament through a hot evaporating zone, wherein solvent from the interior of the filament diffuses to the filament surface and evaporates therefrom, and simultaneously gel solidifies by syneresis into a coherent, non-porous, stretchable solid filamentary structure. In the first step above mentioned the water removes 70 to 80% of the initial solvent, leaving 50–80% by weight of dimethyl formamide in the resultant filaments; and in the second step the dimethyl formamide content must be reduced to not more than about 8% by weight.

The first step of my spinning process must employ a gelling technique at the filament surface rather than evaporation or straight extraction. The constitution of my copolymer, making it relatively soluble in dimethyl formamide and relatively susceptible to dyestuffs, inherently makes the copolymer retentive of dimethyl formamide solvent. Accordingly, my copolymer cannot be spun, except perhaps at an impractical low rate, into an evaporative atmosphere or mere extractive medium: solvent is removed so slowly by evaporation or extraction alone that the filament too long remains weak and tacky, and in that condition too easily pulls apart and sticks to itself and to the spinning apparatus. These difficulties are obviated by spinning into a gelling medium. Aqueous medium performs satisfactorily, rapidly leaving the surface of the filament non-tacky and increasing the strength of the filament to the point of about 0.1 gram per denier at which strength the filament can be passed through the subsequent spinning steps without breakage.

But aqueous gelling alone is incapable of producing a filament which can be stretched to confer satisfactory tensile strength. A filament exposed long enough to water to pass beyond the surface gelled stage is too brittle and powdery for stretching. But if the surface gelled filament, still containing 50–80% by weight of dimethyl formamide solvent, is passed through a hot evaporating zone, the solvent diffuses from the interior of the filament and eventually evaporates from the filament surface and leaves a coherent solid filamentary structure. Filaments thus prepared, in which the dimethyl formamide solvent content has been reduced to about 8% by weight, show a tensile strength increase to about 0.5–1 gram per denier and can be satisfactorily passed through stretching steps which enhance the tensile strength. The temperatures reached in this drying zone are desirably as high as possible, to get fast drying; but not be so high as to weaken the filament unduly. Temperatures about 130–150° C. are preferred.

Filaments containing about 6% or less of dimethyl formamide solvent show greater enhancement of tensile strength following the stretching step than filaments with as much as 8% of dimethyl formamide. Accordingly, the dimethyl formamide content of the filament is preferably reduced to 6% or less before the stretching step.

The filament dried at least down to about 8% by weight of dimethyl formamide and preferably down to 6% by weight or less dimethyl formamide is stretched while subjected to heating to effect about 250% to 1400% increase over the original length. Thereby the tensile strength is raised several fold. Typical filaments from copolymer prepared with incremental addition of the styrene component during the polymerization period can be stretched to a higher degree without breakage, particularly at more elevated oven temperatures such as about 150° C., than can typical filaments from copolymer otherwise prepared. Higher stretch permits spinning of finer deniers and permits more rapid spinning, in feet of filament per minute. Accordingly I prefer carrying out the polymerization step of my process with incremental addition of styrene, employing oven temperature at least about 140°–175° C. in the stretching step, and stretching to about a 900–1400% increase beyond the original length of filament, as in Example 1A below.

Thereafter the filament can be improved in its properties of elongation and resistance to shrinking at elevated temperature, e. g. in boiling water, by preshrinking the filament at elevated temperature. Such treatment produces only a moderate loss of the tensile strength acquired on stretching and increases ultimate elongation to breakage from 6–8% to 20–30%.

As above noted, the filament is readily dyeable e. g. with an acetate dyestuff. It can be subjected to conventional treatments incidental to fabrication thereof into fibers, threads, cloth, screening, netting, cordage, bristles, etc.

Dimethyl formamide solutions of my copolymers are especially suitable for fabrication of filaments and related structures, but can also be employed in fabrication of films, coatings and the like.

The examples which follow are illustrative of my invention, but are not to be understood as limiting the same.

The acrylonitrile employed in the examples was a commercial product purified before use. Distillation, or washing with aqueous mineral acid, are two satisfactory purification methods. The styrene was a commercial product purified by distillation under reduced pressure.

Distilled water was used in making up the polymerization reaction mixtures. The emulsifying agents and catalysts were commercial products. The polymerization reaction vessel was fitted with stirrer, reflux condenser, thermometer and inlet tube for nitrogen which was passed over the surface of the reaction mixture to avoid inhibitory action of oxygen of air.

My copolymers are sufficiently soluble that dimethyl formamide solutions thereof can be made up by mixing into the solvent finely divided polymer added gradually to the dimethyl formamide at room temperature, kneading the mixture by agitation in a vertical plane. Alternatively solutions can be made up by methods applicable to polyacrylonitrile such as chilling dimethyl formamide solvent until the polymer can be dispersed therein without agglomeration, dispersing finely divided polymer in the chilled dimethyl formamide, then warming with stirring until the polymer dissolves.

The solution is filtered to remove any foreign matter and gel particles and is then ready for spinning. The solutions of my acrylonitrile-styrene copolymers are usually milky rather than clear, but are nevertheless spinnable.

In the examples below, intrinsic viscosity was determined in Ostwald-Fenski tubes at 40° C. on 0.125 gram of polymer per 100 cc. of solvent and may therefore be stated as:

Intrinsic viscosity = (time of efflux of solution—time of efflux of the same volume of pure dimethyl formamide) ÷ (0.125 × time of efflux of the same volume of pure dimethyl formamide). Intrinsic viscosity is a measure of the molecular weight of the polymer.

Viscosities of the dimethyl formamide spinning solutions were measured in a rotating viscosimeter. The spinnabilities of the solutions of the examples were judged against solutions of other acrylonitrile polymers and copolymers on the basis of speed of spinning which could be reached without breakage, uniformity in denier and tensile strength of the multifilament yarns obtained and freedom from breakage in continuous operation with operating conditions showing normal variations from nominal values.

Spinning was through a 48 hole spinnerette, each hole 5 mils in diameter, up through a warm water bath maintained at about 50°–94° C., of depth about ¾ to 2½ inches and with a surface layer of toluene to prevent formation of a capillary column of liquid between the emerging filaments. From the bath the filaments passed at a rate of about 2.5 to 12.5 feet per minute countercurrent to heated air. Passage through this drying column reduced the solvent content of the filaments from about 50–80 weight percent to about 5–8 weight percent. Use of a longer drying column would permit more rapid spinning.

The filaments, gathered into a single tow, were then stretched to effect the increase in length stated in the examples by drawing the yarn through an oven heated to 140°–175° C. and winding up at a rate differing from the feed rate by the factor necessary to impart the desired stretch.

Heat preshrinking of the yarn, when applied, was accomplished by drawing the stretched yarn through a heating oven and winding up at a rate slower than the feed rate by the factor corresponding to the desired shrinkage in length.

Percentages and ratios quoted herein are on a weight basis. UTS of the yarns quoted in the examples is "ultimate tensile strength," i. e. tensile strength at break in grams of tension per denier. Denier is for the multifilament yarn. Shrinkage in boiling water is measured after 15 minutes exposure.

*Example 1A.*—80 parts of acrylonitrile and 4.2 parts of styrene along with 448 parts of distilled water and 2 parts of a commercial emulsifying agent of the lauryl sodium sulfate type were introduced into a reaction vessel maintained at a temperature of about 65° C. 5 parts of 30% aqueous hydrogen peroxide were added and after an induction period of about 95 minutes polymerization began.

15.8 parts of additional styrene were then introduced during 30 minutes. The temperature in the reaction vessel varied between 65° and 73° C. After the styrene had been added reaction conditions were maintained for another 40 minutes. Throughout this polymerization the reaction mixture was kept under nitrogen.

A stable latex was produced which was broken by freezing. The polymer was then filtered and washed several times with distilled water and once with methanol and was dried to constant weight. Yield of polymer was 72% of the total weight of monomers. Analysis for nitrogen indicated about 78–79 weight percent of acrylonitrile in the copolymer. Intrinsic viscosity of the copolymer was 4.1.

Samples of this copolymer were dissolved in dimethyl formamide and spun as described above. Solutions had about 12% solids content and viscosities of 700–740 poises and showed spinnability varying in individual samples from fair to good. After stretching 900 to 1400% the yarns obtained varied in UTS from 3.9 to 4.9 grams per denier for different samples. These yarns had deniers of 50 to 130.

A yarn of UTS 4.9 grams per denier was preshrunk 33% at 180° C. The capacity of this yarn for elongation under tension was thereby increased to 28.5% elongation at the breaking point from an original value of 7%; and the shrinkage of the yarn in boiling water was diminished from about 20% to less than 0.5%. The UTS of this preshrunk yarn was 3.4 grams per denier.

The above-described yarn was tested in dye bath of several acetate dyestuffs in comparison with commercial acrylonitrile based yarns. The acrylonitrile-styrene copolymer yarn of this example took up dye rapidly at the boil, reaching a decidedly deeper final shade than was obtainable on the samples employed for comparison even when these were treated for prolonged periods.

*Example 1B.*—When acrylonitrile and styrene in 80:20 and 70:30 weight ratios of the monomers were copolymerized in accordance with Example 2 of U. S. P. 2,417,293 the resulting copolymer, as disclosed in said patent, could not be spun and was virtually insoluble in all solvents including dimethyl formamide, in which it formed only gel particles.

Polymerizations of the monomers in bulk or in solution in organic solvents also fail to give copolymers which are suitable for spinning.

*Example 2.*—Acrylonitrile and styrene were copolymerized, dissolved in dimethyl formamide and spun as in part A of the preceding example, but with the following variations:

1. The full quantities of monomers (in 4:1 weight ratio) were introduced into the reaction vessel at the start.
2. The emulsifying agent was of the alkylaryl polyether type, sulfated.

Results were broadly similar to those of Example 1A. The copolymer was somewhat less soluble in dimethyl formamide than the copolymer of Example 1A. The dimethyl formamide solution showed spinnability rated as fair. Intrinsic viscosity of the copolymer was 4.7 and viscosity of the spinning solution (10% solids) was 380 poises. UTS of a yarn specimen was 2.6 grams per denier (after 375% stretching).

*Example 3.*—Acrylonitrile and styrene were copolymerized in weight ratio of 4:1 as in Example 1A, but employing the full quantity of monomers at the start; employing a 1:14 weight ratio of monomers:water instead of 1:4.48; employing 1 part of ammonium persulfate-0.3 part of sodium metabisulfite catalyst instead of 5 parts of 30% aqueous hydrogen peroxide and using reaction temperatures of 35–40° C. The bisulfite functions both as a promoter of the persulfate polymerization catalyst and as an emulsifying agent.

Intrinsic viscosity of the resulting acrylonitrile-styrene copolymer was 5.4. The copolymer was dissolved in dimethyl formamide and spun as in the preceding examples. The viscosity of the spinning solution (10% solids) was 700 poises. The spinnability was rated fair: A specimen yarn with UTS of 4.1 grams/denier was obtained, but conditions for the production of a good yarn were more critical for this sample than for the sample described in Example 1A.

In accordance with my invention, acrylonitrile and styrene are copolymerized in aqueous emulsion and with use of an inorganic polymerization catalyst with or without a catalyst promoter. The catalysts used are of the type promoting free radical reactions and include peroxy compounds such as hydrogen peroxide, persulfate salts, permanganate salts and the like; positive chlorine compounds such as hypochlorites, etc. The reasons for the success of the emulsion procedure using inorganic polymerization catalyst and temperature not above about 75° C., in conjunction with the spinning procedure above outlined, are not fully understood; but as far as I am aware, successful filaments from acrylonitrile-styrene copolymers can be obtained only by polymerization under the stated conditions and in conjunction with the two step spinning procedure above-described, whereby there is obtained a filament suitable for stretching to confer high tensile strength and flexibility, and readily dyeable.

Use of more than about 4 parts of acrylonitrile monomer per part of styrene monomer (e. g. 9:1 weight ratio of acrylonitrile:styrene instead of 8:2) reduces the solubility and dyeability of the resulting copolymer. Use of less acrylonitrile, e. g. 7:3 weight ratio of acrylonitrile monomer:styrene monomer, leads to poorer spinning or unspinnable copolymer solutions.

I claim:
1. A process for production of a filament consisting essentially of acrylonitrile-styrene copolymer which comprises copolymerizing acrylonitrile and styrene in aqueous emulsion using an inorganic polymerization catalyst and temperatures not above about 75° C., in monomer weight ratios of about 4:1 of acrylonitrile:styrene, dissolving the resulting copolymer in dimethyl formamide, adjusting the solution concentration to viscosity between about 300 and about 1000 poises, extruding said solution in filament form into a water bath wherein the dimethyl formamide content of extruded filament is reduced to about 50–80 weight percent and water enters the filament forming a surface gelled filament of tensile strength at least about 0.1 gram per denier; passing said filament through a hot evaporating zone in which temperatures of about 130°–150° C. are reached and wherein the dimethyl formamide content of said filament is reduced to not more than about 8% by weight, gel being thus converted to coherent solid filament of tensile strength at least about 0.5 gram per denier; and thereafter stretching said filament in a zone maintained at temperatures between about 140° C. and about 175° C. to between about 250% and about 1400% beyond the original filament length.

2. Process as defined in claim 1, wherein the dimethyl formamide content of the filaments is reduced to not more than about 6% by weight before the stretching step.

3. Process as defined in claim 2, wherein styrene component is added to the polymerization reaction mixture at a rate which maintains approximately constant throughout the reaction period the ratio of unreacted monomers present in the reaction mixture; and wherein a stretch of at least 900% is applied in the stretching step.

4. A filament consisting essentially of acrylonitrile-styrene copolymer in weight ratio of about 4:1 of acrylonitrile:styrene, said copolymer being soluble to at least 10 percent by weight in dimethyl formamide at room temperature and being free of substantial quantities of other copolymer constituents, said filament having ultimate tensile strength of at least about 2.5 grams per denier and being readily dyeable with an acetate dyestuff.

5. A solution in dimethyl formamide of acrylonitrile-styrene copolymer of weight ratio about 4:1 of acrylonitrile:styrene, said copolymer being free of substantial quantities of other copolymer constituents, said solution having viscosity at room temperatures between about 300 and 1000 poises and having solids content between about 10 percent and about 15 percent by weight.

References Cited in the file of this patent

UNITED STATES PATENTS

| 2,100,900 | Fikentsher et al. | Nov. 30, 1937 |
| 2,404,714 | Latham | July 23, 1946 |
| 2,432,447 | Scheiderbauer | Dec. 9, 1947 |
| 2,467,553 | Hare | Apr. 19, 1949 |
| 2,577,763 | Hoxie | Dec. 11, 1951 |

OTHER REFERENCES

The Technical Bulletin, vol. 5, No. 2, June 1949, issued by Du Pont, page 97.